US011955043B1

(12) United States Patent
Wu

(10) Patent No.: US 11,955,043 B1
(45) Date of Patent: Apr. 9, 2024

(54) APPARATUS FOR PERFORMING SUBPIXEL RENDERING OF RGBW DISPLAY PANEL

(71) Applicant: HIMAX TECHNOLOGIES LIMITED, Tainan (TW)

(72) Inventor: Tung Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/933,858

(22) Filed: Sep. 21, 2022

(51) Int. Cl.
*G09G 3/20* (2006.01)
*G09G 5/06* (2006.01)

(52) U.S. Cl.
CPC ............. *G09G 3/2003* (2013.01); *G09G 5/06* (2013.01); *G09G 2300/0443* (2013.01); *G09G 2310/027* (2013.01); *G09G 2360/16* (2013.01)

(58) Field of Classification Search
CPC ............... G09G 3/2003; G09G 3/2074; G09G 2340/06; H10K 59/351
See application file for complete search history.

(56) References Cited

U.S. PATENT DOCUMENTS

2013/0120472 A1* 5/2013 Byun ........................ G09G 5/02 345/88
2018/0158394 A1* 6/2018 Guo ..................... G09G 3/2003
2018/0211577 A1* 7/2018 Pan ...................... G09G 3/3208
2019/0221171 A1* 7/2019 Zha ........................ G09G 3/342

* cited by examiner

*Primary Examiner* — Yuzhen Shen
(74) *Attorney, Agent, or Firm* — CKC & Partners Co., LLC

(57) ABSTRACT

An apparatus for performing subpixel rendering of an RGBW display panel is provided. The apparatus receives an input gray level data to acquire a luminance value of each subpixel of a RGB pixel set including two RGB pixels adjacent to each other. The apparatus calculates a rendered luminance value of each subpixel of a display pixel set including two display pixels adjacent to each other according to the luminance values. The display pixel set of the RGBW display panel includes red, green, blue, and white subpixels. The rendered luminance value of the white subpixel of one of the display pixels is determined according to the saturation value of the corresponding RGB pixel and the luminance value of each subpixel of the corresponding RGB pixel. The apparatus acquires a gray level value of each white subpixel of the display pixel set according to the rendered luminance values.

16 Claims, 4 Drawing Sheets

APPARATUS FOR PERFORMING SUBPIXEL RENDERING OF RGBW DISPLAY PANEL

BACKGROUND

Field of Invention

The present invention relates to an apparatus for performing subpixel rendering of an RGBW display panel.

Description of Related Art

A display panel equipped with red, green, blue, and white sub-pixels may be referred to as an RGBW display panel, where R, G, B, and W may stand for red, green, blue, and white, respectively. As the percentage of chromatic sub-pixels (e.g. red, green, and blue sub-pixels) of the RGBW display panel is lower than that of an RGB display panel equipped with red, green, and blue sub-pixels, the RGBW display panel typically has lower color brightness than that of the RGB display panel. More particularly, when the RGBW display panel is displaying chromatic contents, the color and/or the brightness of the chromatic contents may be insufficient, thereby typically causing poor user experience of an end user of the RGBW display panel. Thus, a novel method and associated architecture are required for enhancing the overall performance of the RGBW display panel.

SUMMARY

The present invention provides an apparatus for performing subpixel rendering of an RGBW display panel. The apparatus includes a gray-to-luminance circuit, a color brightness calculation circuit coupled to the gray-to-luminance circuit, and a luminance-to-gray circuit coupled to the color brightness calculation circuit, and a HSV calculation circuit. The gray-to-luminance circuit is configured to receive an input gray level data and correspondingly acquire a luminance value of each subpixel of a RGB pixel set including a first RGB pixel and a second RGB pixel adjacent to each other. Each of the first RGB pixel and the second RGB pixel includes a first color subpixel, a second color subpixel, and a third color subpixel. The color brightness calculation circuit is configured to calculate a rendered luminance value of each color subpixel of a display pixel set of the RGBW display panel. The display pixel set includes a first display pixel and a second display pixel adjacent to each other. The first display pixel corresponding to the first RGB pixel includes a first color subpixel, a second color subpixel, and a white subpixel. The second display pixel corresponding to the second RGB pixel includes a first color subpixel, a third color subpixel, and a white subpixel. The luminance-to-gray circuit is configured to receive the rendered luminance value of each subpixel of the display pixel set and correspondingly acquire a gray level value of each subpixel of the display pixel set. The HSV calculation circuit is configured to receive the input gray level data and correspondingly acquires a saturation value of each of the first RGB pixel and the second RGB pixel. The color brightness calculation circuit coupled to the HSV calculation circuit is further configured to acquire a first saturation gain according to the saturation value of the first RGB pixel and acquire a second saturation gain according to the saturation value of the second RGB pixel.

In accordance with one or more embodiments of the invention, a ratio of the rendered luminance values of the first color subpixel and the second color subpixel of the first display pixel is identical to a ratio between the luminance value of the first color subpixel of the first RGB pixel and a first sum of the luminance values of the second color subpixels of the first RGB pixel and the second RGB pixel. A ratio of the rendered luminance values of the first color subpixel and the third color subpixel of the second display pixel is identical to a ratio between the luminance value of the first color subpixel of the second RGB pixel and a second sum of the luminance values of the third color subpixels of the first RGB pixel and the second RGB pixel.

In accordance with one or more embodiments of the invention, the apparatus further includes a memory configured to store a gray-level-luminance lookup table and a saturation-color-gain lookup table. The gray-to-luminance circuit coupled to the memory is configured to acquire the luminance value of each subpixel of the RGB pixel set according to the input gray level data by utilizing the gray-level-luminance lookup table. The luminance-to-gray circuit coupled to the memory is configured to acquire the gray level value of each subpixel of the display pixel set according to the rendered luminance value of each subpixel of the display pixel set by utilizing the gray-level-luminance lookup table. The color brightness calculation circuit coupled to the memory is configured to acquire the first saturation gain according to the saturation value of the first RGB pixel by utilizing the saturation-color-gain lookup table and acquire the second saturation gain according to the saturation value of the second RGB pixel by utilizing the saturation-color-gain lookup table.

In accordance with one or more embodiments of the invention, the color brightness calculation circuit is configured to set the rendered luminance value of the second color subpixel of the first display pixel as a product of the first saturation gain and the first sum when the first sum is less than a maximum luminance value of each subpixel of the RGBW display panel. The color brightness calculation circuit is configured to set the rendered luminance value of the third color subpixel of the second display pixel as a product of the second saturation gain and the second sum when the second sum is less than the maximum luminance value.

In accordance with one or more embodiments of the invention, the color brightness calculation circuit is further configured to set the rendered luminance value of the second color subpixel of the first display pixel as the maximum luminance value when the first sum is not less than the maximum luminance value. The color brightness calculation circuit is further configured to set the rendered luminance value of the third color subpixel of the second display pixel as the maximum luminance value when the second sum is not less than the maximum luminance value.

In accordance with one or more embodiments of the invention, the color brightness calculation circuit is further configured to set the rendered luminance value of the first color subpixel of the first display pixel as a product of the first saturation gain and the luminance value of the first color subpixel of the first RGB pixel when the first sum is less than the maximum luminance value. The color brightness calculation circuit is further configured to set the rendered luminance value of the first color subpixel of the second display pixel as a product of the second saturation gain and the luminance value of the first color subpixel of the second RGB pixel when the second sum is less than the maximum luminance value.

In accordance with one or more embodiments of the invention, the color brightness calculation circuit is further configured to multiply the maximum luminance value by the luminance value of the first color subpixel of the first RGB pixel to acquire a first product and then divide the first product by the first sum to acquire the rendered luminance value of the first color subpixel of the first display pixel when the first sum is not less than the maximum luminance value. The color brightness calculation circuit is further configured to multiply the maximum luminance value by the luminance value of the first color subpixel of the second RGB pixel to acquire a second product and then divide the second product by the second sum to acquire the rendered luminance value of the first color subpixel of the second display pixel when the second sum is not less than the maximum luminance value.

In accordance with one or more embodiments of the invention, the apparatus further includes a white brightness calculation circuit coupled to the gray-to-luminance circuit and configured to calculate a rendered luminance value of each white subpixel of the display pixel set. The rendered luminance value of the white subpixel of the first display pixel is determined according to the saturation value of the first RGB pixel and the luminance value of each subpixel of the first RGB pixel. The rendered luminance value of the white subpixel of the second display pixel is determined according to the saturation value of the second RGB pixel and the luminance value of each subpixel of the second RGB pixel.

In accordance with one or more embodiments of the invention, the white brightness calculation circuit is further configured to acquire a first saturation gray white weight and a first saturation color white weight according to the saturation value of the first RGB pixel and acquire a second saturation gray white weight and a second saturation color white weight according to the saturation value of the second RGB pixel.

In accordance with one or more embodiments of the invention, the memory coupled to the white brightness calculation circuit is further configured to store a saturation-gray-white-weight lookup table and a saturation-color-white-weight lookup table. The white brightness calculation circuit is configured to acquire the first saturation gray white weight according to the saturation value of the first RGB pixel by utilizing the saturation-gray-white-weight lookup table and acquire the first saturation color white weight according to the saturation value of the first RGB pixel by utilizing the saturation-color-white-weight lookup table. The white brightness calculation circuit is configured to acquire the second saturation gray white weight according to the saturation value of the second RGB pixel by utilizing the saturation-gray-white-weight lookup table and acquire the second saturation color white weight according to the saturation value of the second RGB pixel by utilizing the saturation-color-white-weight lookup table.

In accordance with one or more embodiments of the invention, the white brightness calculation circuit is configured to set the rendered luminance value of the white subpixel of the first display pixel as a third product of the first saturation gray white weight and a sum of the luminance values of the subpixels of the first RGB pixel when the first sum is less than the maximum luminance value. The white brightness calculation circuit is configured to set the rendered luminance value of the white subpixel of the second display pixel as a fourth product of the second saturation gray white weight and a sum of the luminance values of the subpixels of the second RGB pixel when the second sum is less than the maximum luminance value.

In accordance with one or more embodiments of the invention, the white brightness calculation circuit is further configured to multiply the first saturation color white weight by a difference between the first sum and the maximum luminance value to acquire a fifth product and then add the third product and the fifth product to acquire the rendered luminance value of the white subpixel of the first display pixel when the first sum is not less than the maximum luminance value. The white brightness calculation circuit is further configured to multiply the second saturation color white weight by a difference between the second sum and the maximum luminance value to acquire a sixth product and then add the fourth product and the sixth product to acquire the rendered luminance value of the white subpixel of the second display pixel when the second sum is not less than the maximum luminance value.

In accordance with one or more embodiments of the invention, the first saturation gain increases as the saturation value of the first RGB pixel increases. The second saturation gain increases as the saturation value of the second RGB pixel increases.

In accordance with one or more embodiments of the invention, each of the first saturation gain and the second saturation gain is in a range of 1 to 2.

In accordance with one or more embodiments of the invention, the first saturation gray white weight decreases and the first saturation color white weight increases as the saturation value of the first RGB pixel increases. The second saturation gray white weight decreases and the second saturation color white weight increases as the saturation value of the second RGB pixel increases.

In accordance with one or more embodiments of the invention, each of the first saturation gray white weight, the first saturation color white weight, the second saturation gray white weight, and the second saturation color white weight is in a range of 0 to 1.

The present invention further provides an apparatus for performing subpixel rendering of an RGBW display panel. The apparatus includes a gray-to-luminance circuit, a HSV calculation circuit, a white brightness calculation circuit coupled to the gray-to-luminance circuit and the HSV calculation circuit, and a luminance-to-gray circuit coupled to the white brightness calculation circuit. The gray-to-luminance circuit is configured to receive an input gray level data and correspondingly acquire a luminance value of each subpixel of a RGB pixel set including a first RGB pixel and a second RGB pixel adjacent to each other. Each of the first RGB pixel and the second RGB pixel includes red, green, and blue subpixels. The HSV calculation circuit is configured to receive the input gray level data and correspondingly acquire a saturation value of each of the first RGB pixel and the second RGB pixel. The white brightness calculation circuit is configured to calculate a rendered luminance value of each white subpixel of a display pixel set of the RGBW display panel. The display pixel set includes a first display pixel and a second display pixel adjacent to each other. The first display pixel corresponds to the first RGB pixel and the second display pixel corresponds to the second RGB pixel. Each of the first display pixel and the second display pixel includes a white subpixel and two of a red subpixel, a green subpixel, and a blue subpixel. The display pixel set includes red, green, blue, and white subpixels. The rendered luminance value of the white subpixel of the first display pixel is determined according to the saturation value of the first RGB pixel and the luminance value of each subpixel of the first RGB pixel. The rendered luminance value of the white subpixel of the second display pixel is determined according to the saturation value of the second RGB pixel and the luminance value of each subpixel of the second RGB pixel. The luminance-to-gray circuit is configured to receive the rendered luminance value of each white subpixel of the display pixel set and correspondingly acquire a gray level value of each white subpixel of the display pixel set.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
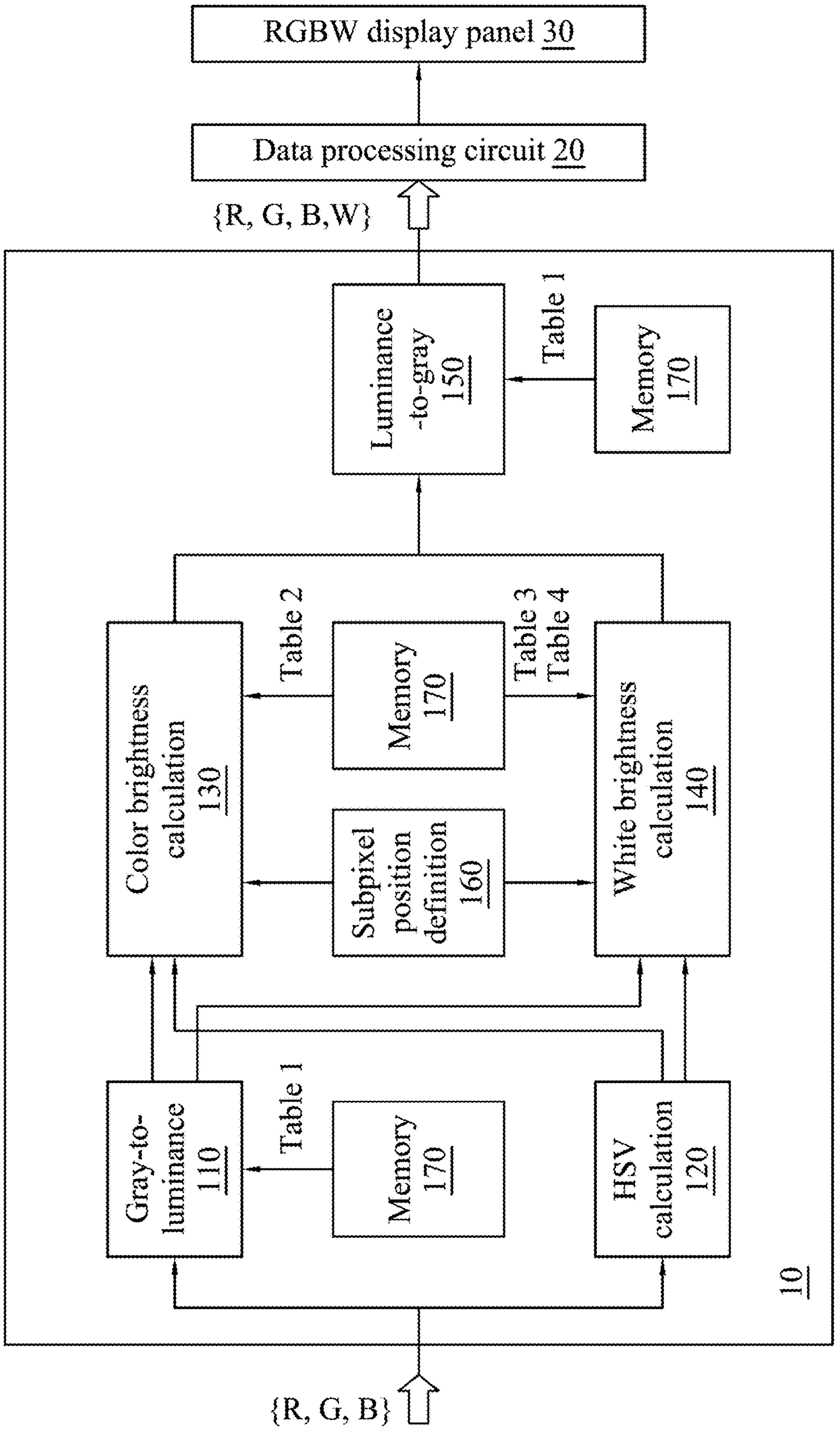
FIG. 1 illustrates a display system according to some embodiments of the present invention.

FIG. 1 illustrates a display system according to some embodiments of the present invention. The display system includes an RGBW display panel 30, a data processing circuit 20, and an apparatus 10 (or called a timing controller) for performing subpixel rendering of the RGBW display panel 30. The RGBW display panel 30 includes red, green, blue, and white sub-pixels. The data processing circuit 20 at least includes one or more source drivers and one or more gate drivers for driving the RGBW display panel 30. The data processing circuit 20 may further include a digital gamma correction (DGC) circuit, a dithering circuit, an over drive (OD) circuit, and/or another image processing circuit. In some of embodiments of the present invention, the RGBW display panel 30 is μLED display panel, but the present invention is not limited thereto.

The apparatus 10 includes a gray-to-luminance circuit 110, a HSV calculation circuit 120, a color brightness calculation circuit 130, a white brightness calculation circuit 140, and a luminance-to-gray circuit 150. The apparatus 10 may receive a set of one or more video signals (depicted with an arrow around the leftmost of FIG. 1, for better comprehension) and control the RGBW display panel 30 to display images according to the set of one or more video signals, and may adaptively adjust the images when needed.

According to some embodiments, the set of one or more video signals may carry input gray level data {R, G, B} of an image frame (e.g. a picture, a photograph, etc.) with the input gray level data {R, G, B} corresponding to red, green, and blue color channels of the image frame, respectively. The apparatus 10 is arranged to receive the set of one or more video signals to obtain the input gray level data {R, G, B}, and perform data conversion on the input gray level data {R, G, B} to generate output gray level data {R, G, B, W} on the red, the green, the blue, and the white display channels, respectively.

Figure 2:
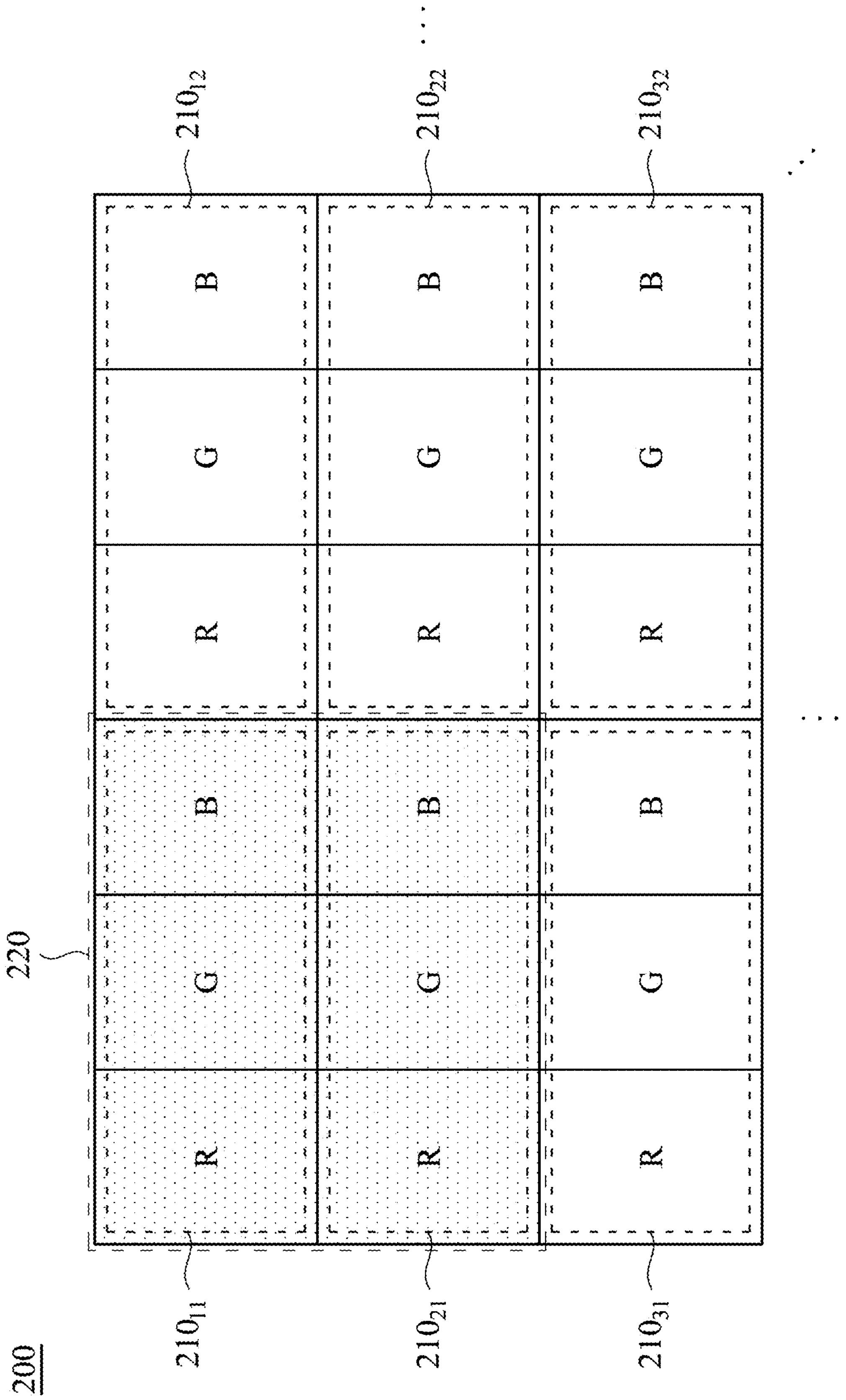
FIG. 2 illustrates a subpixel arrangement corresponding to input gray level data according to some embodiments of the present invention.

FIG. 2 illustrates subpixel arrangement 200 corresponding to the input gray level data according to some embodiments of the present invention. The subpixel arrangement 200 includes plural RGB pixels arranged in rows and columns, such as the RGB pixels {$\mathbf{210}_{11}$, $\mathbf{210}_{12}$, $\mathbf{210}_{13}$, . . . } of a first row, the RGB pixels {$\mathbf{210}_{21}$, $\mathbf{210}_{22}$, $\mathbf{210}_{23}$, . . . } of a second row, the RGB pixels {$\mathbf{210}_{31}$, $\mathbf{210}_{32}$, $\mathbf{210}_{33}$, . . . } of a third row, etc. Each of the RGB pixels includes a red subpixel, a green subpixel, and a blue subpixel. For better comprehension, the subpixels of the RGB pixels shown in FIG. 2 are labeled with R, G, and B to indicate that they are red, green, and blue subpixels, respectively.

Figure 3:
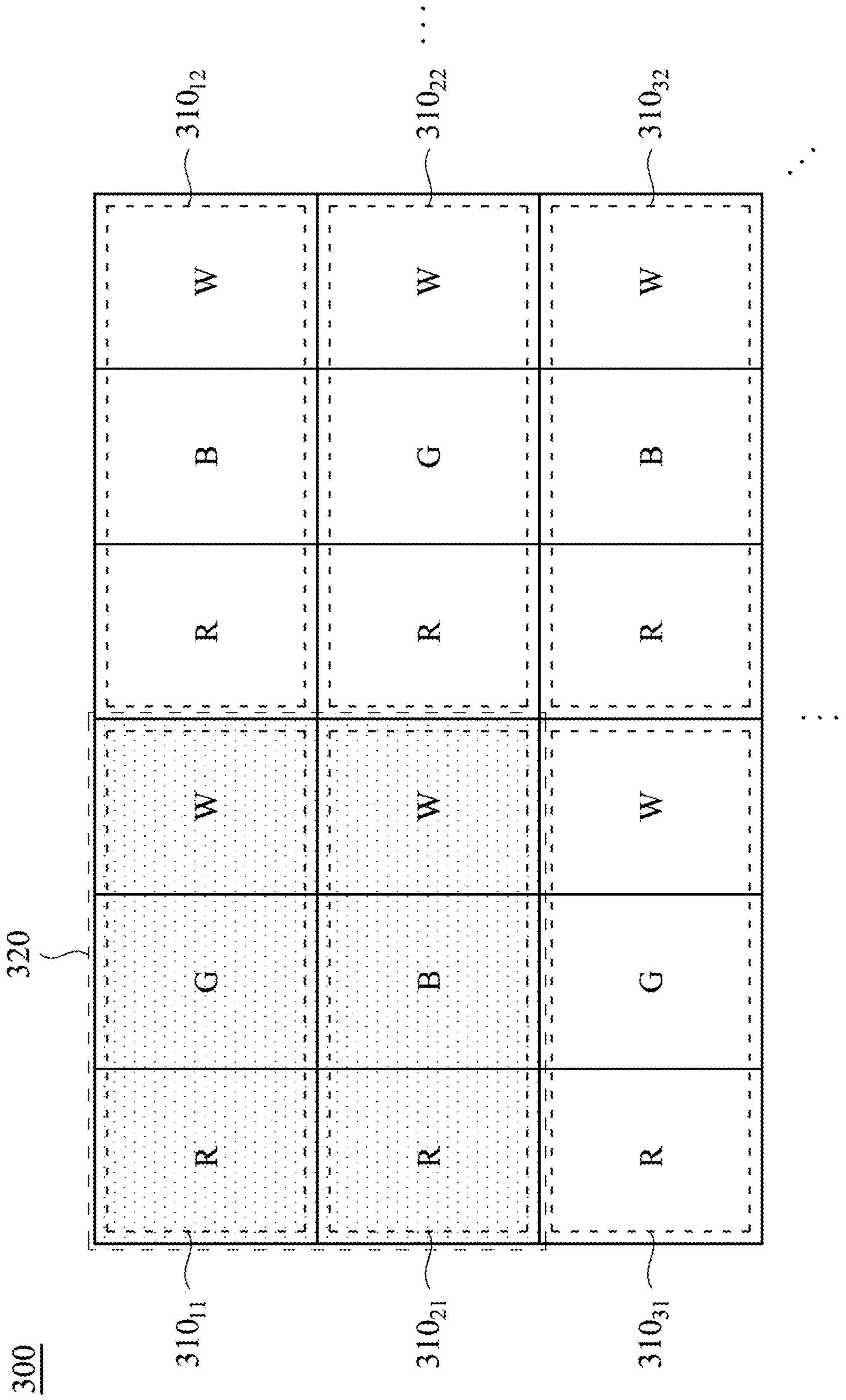
FIG. 3 illustrates a subpixel arrangement corresponding to display pixels of the RGBW display panel according to some embodiments of the present invention.

FIG. 3 illustrates subpixel arrangement 300 corresponding to display pixels of the RGBW display panel 30 according to some embodiments of the present invention. The subpixel arrangement 300 includes plural display pixels arranged in rows and columns, such as the display pixels {$\mathbf{310}_{11}$, $\mathbf{310}_{12}$, $\mathbf{310}_{13}$, . . . } of a first row, the display pixels {$\mathbf{310}_{21}$, $\mathbf{310}_{22}$, $\mathbf{310}_{23}$, . . . } of a second row, the display pixels {$\mathbf{310}_{31}$, $\mathbf{310}_{32}$, $\mathbf{310}_{33}$, . . . } of a third row, etc. For better comprehension, the subpixels of the display pixels shown in FIG. 3 are labeled with R, G, B, and W to indicate that they are red, green, blue, and white subpixels, respectively.

According to some embodiments, each of the display pixels includes a white subpixel and two of a red subpixel, a green subpixel, and a blue subpixel. For example, the embodiment of FIG. 3 shows that each of the display pixels includes a white subpixel, a red subpixel, and one of a green subpixel and a blue subpixel, but the present invention is not limited thereto. In other embodiments of the present invention, each of the display pixels may include a white subpixel, a green subpixel, and one of a red subpixel and a blue subpixel. In some other embodiments of the present invention, each of the display pixels may include a white subpixel, a blue subpixel, and one of a red subpixel and a green subpixel.

According to some embodiments, the subpixel arrangement of one of display pixels is different from the subpixel arrangement of the other one of display pixels that is adjacent to the one of the display pixels. For example, the embodiment of FIG. 3 shows that the subpixel arrangement of the display pixel $\mathbf{310}_{11}$ (i.e., {R, G, W}) is different from the subpixel arrangement of the adjacent display pixel $\mathbf{310}_{12}$ or $\mathbf{310}_{21}$ (i.e., {R, B, W}).

Figure 4:
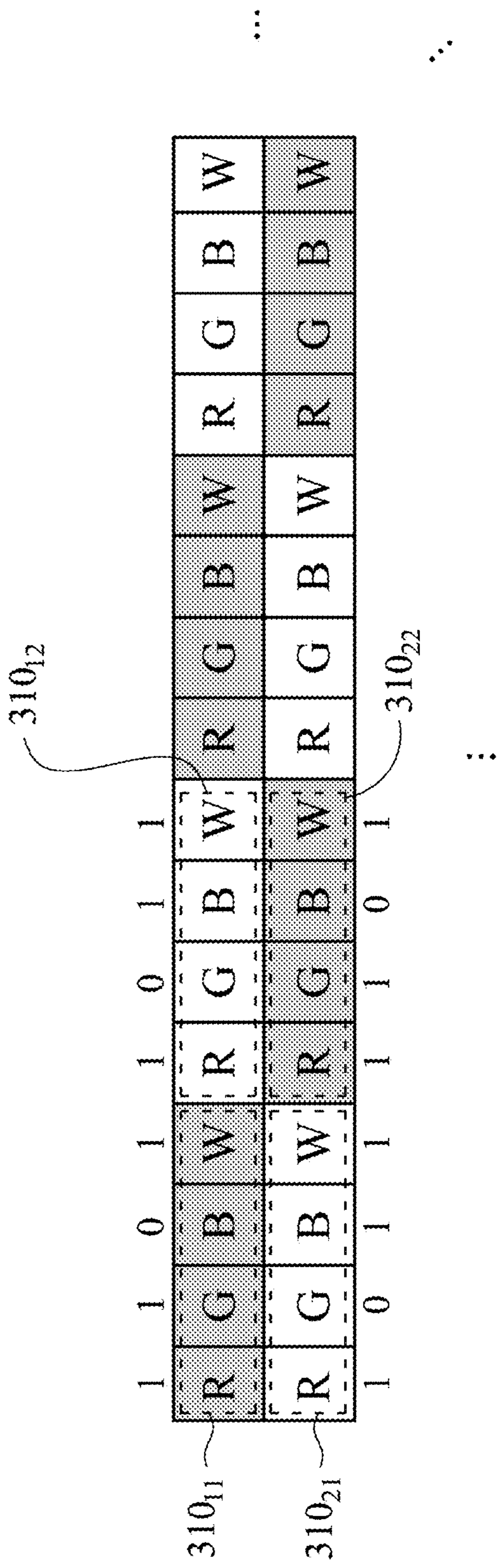
FIG. 4 illustrates a subpixel arrangement type corresponding to subpixel arrangement of FIG. 3.

Corresponding to the subpixel arrangement 300, the apparatus 10 further includes a subpixel position definition circuit 160 which has a register for defining subpixel arrangement type of the display pixels of the RGBW display panel 30. FIG. 4 illustrates a subpixel arrangement type corresponding to subpixel arrangement 300. For example, the subpixel arrangement of the display pixel $\mathbf{310}_{11}$ is {R, G, W}, and thus the subpixel position definition circuit 160 setting the corresponding subpixels by enabling the red subpixel (logic "1"), enabling the green subpixel (logic "1"), disabling the blue subpixel (logic "0"), and enabling the white subpixel (logic "1").

According to some embodiments, two adjacent RGB pixels are combined as a RGB pixel set. In other word, the RGB pixel set is composed of two RGB pixels adjacent to each other along to a vertical direction or a horizontal direction. For example, FIG. 2 shows that a RGB pixel set 220 is composed of the RGB pixel $\mathbf{210}_{11}$ and the RGB pixel $\mathbf{210}_{21}$ adjacent to each other along to a vertical direction, but the present invention is not limited thereto. In other embodiments of the present invention, the RGB pixel set may be composed of two RGB pixels (e.g., the RGB pixel $\mathbf{210}_{11}$ and the RGB pixel $\mathbf{210}_{12}$) adjacent to each other along to a vertical direction.

According to some embodiments, two adjacent display pixels of the RGBW display panel 30 are combined as a display pixel set. In other word, the display pixel set is composed of two display pixels adjacent to each other along to a vertical direction or a horizontal direction. For example, FIG. 3 shows that a display pixel set 320 is composed of the display pixel $\mathbf{310}_{11}$ and the display pixel $\mathbf{310}_{21}$ adjacent to each other along to a vertical direction, but the present invention is not limited thereto. In other embodiments of the present invention, the display pixel set may be composed of two display pixels (e.g., the display pixel $\mathbf{310}_{11}$ and the display pixel $\mathbf{310}_{12}$) adjacent to each other along to a vertical direction. It is noted that the arrangement direction of two adjacent RGB pixels of the RGB pixel set is identical to the arrangement direction of two adjacent display pixels of the display pixel.

Turning now to FIG. 1, the apparatus 10 further includes a memory 170. The memory 170 may be a non-volatile memory for storing plural lookup tables. The gray-to-luminance circuit 110 receives the set of one or more video signals to obtain the input gray level data and then correspondingly acquire a luminance value of each subpixel of the RGB pixel set. Specifically, the gray-to-luminance circuit 110 is coupled to the memory 170, and the gray-to-luminance circuit 110 acquires the luminance value of each subpixel of the RGB pixel set according to the input gray level data by utilizing the gray-level-luminance lookup table stored in the memory 170. The gray-level-luminance lookup table shows the relationship between the gray level value and the corresponding luminance value based on the gamma curve (e.g., the 2.2 gamma curve). Table 1 shows portions of the gray-level-luminance lookup table. The gray level value is normalized to a range of 0 to 1023. For example, when the input gray level data represents that the gray level value of one of the red subpixels is normalized to 32, then the corresponding luminance vale of the one of the red subpixels is 6. In order to reduce the amount of data maintained in the gray-level-luminance lookup table, the output luminance values corresponding to the input gray level values that are in blocks of multiple levels (e.g., 32 levels) may be maintained and an output luminance value corresponding to an input gray level value not maintained in the table data can be determined by appropriate interpolation, such as linear interpolation generally used. Note that Table 1 is merely an illustrated example, and the present invention is not limited thereto.

TABLE 1

| Gray level Value | 0 | 32 | 64 | 96 | . . . | 992 | 1023 |
|---|---|---|---|---|---|---|---|
| R Luminance | 0 | 6 | 29 | 72 | . . . | 12249 | 13107 |
| G Luminance | 0 | 22 | 103 | 252 | . . . | 42872 | 45875 |
| B Luminance | 0 | 3 | 15 | 36 | . . . | 6125 | 6554 |
| W Luminance | 0 | 32 | 147 | 360 | . . . | 61246 | 65536 |

The HSV calculation circuit 120 receives the set of one or more video signals to obtain the input gray level data and then correspondingly acquire a saturation value of each of the RGB pixels. The saturation value S of one of the RGB pixels is indicated with following formula.

$$S=(\text{Max}-\text{Min})/\text{Max}*1023$$

wherein Max denotes the maximum value of the gray level values of three subpixels of the one of the RGB pixels, and Min denotes the minimum value of the gray level values of three subpixels of the one of the RGB pixels. Note that the saturation value S may take a value from 0 to 1023. The saturation value S is an index for representing a color, and is an attribute that indicates the degree of brilliance of the color. The saturation S varies from 0 to 1023, and has a maximum purity at S=1023, and has a maximum gray at S=0.

The embodiment of FIG. 2 shows that each of the RGB pixel $\mathbf{210}_{11}$ and the RGB pixel $\mathbf{210}_{21}$ of the RGB pixel set 220 includes a red subpixel (also called the first color subpixel herein), a green subpixel (also called the second color subpixel herein), and a blue subpixel (also called the third color subpixel herein). The embodiment of FIG. 3 shows that the display pixel $\mathbf{310}_{11}$ of the display pixel set 320 includes a white subpixel, a red subpixel (also called the first color subpixel herein), and a green subpixel (also called the second color subpixel herein), and the display pixel $\mathbf{310}_{21}$ of the display pixel set 320 includes a white subpixel, a red subpixel (also called the first color subpixel herein), and a blue subpixel (also called the third color subpixel herein).

The color brightness calculation circuit 130 is coupled to the gray-to-luminance circuit 110, the HSV calculation circuit 120, and the memory 170. The color brightness calculation circuit 130 receives the luminance value of each subpixel of the RGB pixel set from the gray-to-luminance circuit 110 and receives the saturation value of each RGB pixel of the RGB pixel set from the HSV calculation circuit 120, and then correspondingly calculates a rendered luminance value of each color subpixel of the display pixel set of the RGBW display panel 30.

The process that the color brightness calculation circuit 130 calculates the rendered luminance value of each color subpixel of the display pixel set of the RGBW display panel 30 is discussed below.

First, the color brightness calculation circuit 130 calculates a sum (also called a first sum herein) of the luminance values of the second color subpixels of the first RGB pixel and the second RGB pixel and calculates a sum (also called a second sum herein) of the luminance values of the third color subpixels of the first RGB pixel and the second RGB pixel. For example, for the embodiment of FIG. 2, the color brightness calculation circuit 130 calculates a first sum (e.g., L(G(x,y)+L(G(x,y+1)), wherein L(G(x,y)) denotes the luminance value of G(x,y), and G(x,y) denotes the gray level value of the green subpixel located at pixel position (x,y) corresponding to the subpixel arrangement 200) of the luminance values of the green subpixels of the RGB pixels $\mathbf{210}_{11}$ and $\mathbf{210}_{21}$ and calculates a second sum (e.g., L(B(x,y)+L(B(x,y+1)), wherein B(x,y) denotes the gray level value of the blue subpixel located at pixel position (x,y) corresponding to the subpixel arrangement 200) of the luminance values of the blue subpixels of the RGB pixels $\mathbf{210}_{11}$ and $\mathbf{210}_{21}$.

Second, the color brightness calculation circuit 130 determines whether the aforementioned sum (i.e., the first sum or the second sum) is less than a maximum luminance value of each subpixel of the RGBW display panel 30. Specifically, the maximum luminance value is the luminance characteristic approaches a maximum luminance value that the RGBW display panel 30 can display. In other words, the maximum luminance value may correspond to the maximum operating limits of the RGBW display panel 30.

Third, the color brightness calculation circuit 130 receives the saturation value of each RGB pixel of the RGB pixel set from the HSV calculation circuit 120, and then correspondingly acquires a saturation gain according to the saturation value of each RGB pixel by utilizing a saturation-color-gain lookup table stored in the memory 170. The saturation-color-gain lookup table shows the relationship between the saturation value and the corresponding saturation gain. Table 2 shows portions of the saturation-color-gain lookup table. The saturation value is normalized to a range of 0 to 1023. For example, when the input saturation value is normalized to 144, then the corresponding saturation gain is 1.5. In order to reduce the amount of data maintained in the saturation-color-gain lookup table, the output saturation gains corresponding to the input saturation values that are in blocks of multiple levels may be maintained and an output saturation gain corresponding to an input saturation value not maintained in the table data can be determined by appropriate interpolation, such as linear interpolation generally used. Note that Table 2 is merely an illustrated example, and the present invention is not limited thereto.

TABLE 2

| Saturation value | 0 | 8 | 16 | 24 | 144 | . . . | 512 | 1023 |
|---|---|---|---|---|---|---|---|---|
| Saturation gain | 1 | 1 | 1 | 1 | 1.5 | . . . | 2 | 2 |

As shown in Table 2, the saturation gain increases as the saturation value increases. In other words, the first saturation gain increases as the saturation value of the first RGB pixel increases, and the second saturation gain increases as the saturation value of the second RGB pixel increases. As shown in Table 2, the saturation gains are in a range of 1 to 2. In other words, each of the first saturation gain and the second saturation gain is in a range of 1 to 2.

Fourth, when the color brightness calculation circuit 130 determines that the first sum is less than the maximum luminance value, the color brightness calculation circuit 130 sets the rendered luminance value of the second color subpixel of the first display pixel as a product of the first saturation gain and the first sum. For example, for the embodiment of FIG. 2 and FIG. 3, when the first sum is less than the maximum luminance value (e.g., when L(G(x,y)+L(G(x,y+1)<L(G(255)), wherein L(G(255)) denotes the maximum luminance value of each green subpixel of the RGBW display panel 30), the rendered luminance value of the second color subpixel of the first display pixel (e.g., the green subpixel G of the display pixel 310$_{11}$) is set as a product of the first saturation gain and the first sum (e.g., (L(G(x,y)+L(G(x,y+1))*first saturation gain). Specifically, since the first sum of the luminance values of the second color subpixels of the RGB pixel set is less than the maximum luminance value, the first sum is assigned to the second color subpixel of the first display pixel, and the first sum is further multiplied with the first saturation gain to keep color and brightness consistency.

Similarly, when the color brightness calculation circuit 130 determines that the second sum is less than the maximum luminance value, the color brightness calculation circuit 130 sets the rendered luminance value of the third color subpixel of the second display pixel as a product of the second saturation gain and the second sum. For example, for the embodiment of FIG. 2 and FIG. 3, when the second sum is less than the maximum luminance value (e.g., when L(B(x,y)+L(B(x,y+1)<L(B(255)), wherein L(B(255)) denotes the maximum luminance value of each blue subpixel of the RGBW display panel 30), the rendered luminance value of the third color subpixel of the second display pixel (e.g., the blue subpixel B of the display pixel 310$_{21}$) is set as a product of the second saturation gain and the second sum (e.g., (L(B(x,y)+L(B(x,y+1))*second saturation gain). Specifically, since the second sum of the luminance values of the third color subpixels of the RGB pixel set is less than the maximum luminance value, the second sum is assigned to the third color subpixel of the second display pixel, and the second sum is further multiplied with the second saturation gain to keep color and brightness consistency.

In addition, when the color brightness calculation circuit 130 determines that the first sum is less than the maximum luminance value, the color brightness calculation circuit 130 sets the rendered luminance value of the first color subpixel of the first display pixel as a product of the first saturation gain and the luminance value of the first color subpixel of the first RGB pixel. For example, for the embodiment of FIG. 2 and FIG. 3, when the first sum is less than the maximum luminance value (e.g., when L(G(x,y)+L(G(x,y+1)<L(G(255))), the rendered luminance value of the first color subpixel of the first display pixel (e.g., the red subpixel R of the display pixel 310$_{11}$) is set as a product of the first saturation gain and the luminance value of the first color subpixel of the first RGB pixel (e.g., L(R(x,y)*first saturation gain). Specifically, since the first sum of the luminance values of the second color subpixels of the RGB pixel set is less than the maximum luminance value, the luminance value of the first color subpixel of the first RGB pixel is assigned to the first color subpixel of the first display pixel, and the luminance value of the first color subpixel of the first RGB pixel is further multiplied with the first saturation gain to keep color and brightness consistency.

Similarly, when the color brightness calculation circuit 130 determines that the second sum is less than the maximum luminance value, the color brightness calculation circuit 130 sets the rendered luminance value of the first color subpixel of the second display pixel as a product of the second saturation gain and the luminance value of the first color subpixel of the second RGB pixel. For example, for the embodiment of FIG. 2 and FIG. 3, when the second sum is less than the maximum luminance value (e.g., when L(B(x,y)+L(B(x,y+1)<L(B(255))), the rendered luminance value of the first color subpixel of the second display pixel (e.g., the red subpixel R of the display pixel 310$_{21}$) is set as a product of the second saturation gain and the luminance value of the first color subpixel of the second RGB pixel (e.g., L(R(x,y+1)*second saturation gain). Specifically, since the second sum of the luminance values of the third color subpixels of the RGB pixel set is less than the maximum luminance value, the luminance value of the first color subpixel of the second RGB pixel is assigned to the first color subpixel of the second display pixel, and the luminance value of the first color subpixel of the second RGB pixel is further multiplied with the second saturation gain to keep color and brightness consistency.

To sum up, when the first sum is less than the maximum luminance value, the rendered luminance value of the second color subpixel of the first display pixel (e.g., the green subpixel G of the display pixel 310$_{11}$) is set as a product of the first saturation gain and the first sum (e.g., (L(G(x,y)+L(G(x,y+1))*first saturation gain), and the rendered luminance value of the first color subpixel of the first display pixel (e.g., the red subpixel R of the display pixel 310$_{11}$) is set as a product of the first saturation gain and the luminance value of the first color subpixel of the first RGB pixel (e.g., L(R(x,y)*first saturation gain). Therefore, a ratio of the rendered luminance values of the first color subpixel and the second color subpixel of the first display pixel (e.g., $$\left.\frac{L(R(x,y)*\text{first saturation gain}}{(L(G(x,y)+L(G(x,y+1))*\text{first saturation gain}}\right)$$

is identical to a ratio between the luminance value of the first color subpixel of the first RGB pixel and the first sum (e.g., $$\left.\frac{L(R(x,y)}{L(G(x,y)+L(G(x,y+1)}\right).$$

Similarly, when the second sum is less than the maximum luminance value, the rendered luminance value of the third color subpixel of the second display pixel (e.g., the blue subpixel G of the display pixel 310$_{21}$) is set as a product of the second saturation gain and the second sum (e.g., (L(B (x,y)+L(B(x,y+1))*second saturation gain), and the rendered luminance value of the first color subpixel of the second display pixel (e.g., the red subpixel R of the display pixel 310$_{21}$) is set as a product of the second saturation gain and the luminance value of the first color subpixel of the second RGB pixel (e.g., L(R(x,y+1)*second saturation gain). Therefore, a ratio of the rendered luminance values of the first color subpixel and the third color subpixel of the second display pixel (e.g., $$\left.\frac{L(R(x,y+1)*\text{second saturation gain}}{(L(B(x,y)+L(B(x,y+1))*\text{second saturation gain}}\right)$$

is identical to a ratio between the luminance value of the first color subpixel of the second RGB pixel and the second sum (e.g., $$\left.\frac{L(R(x,y+1)}{L(B(x,y)+L(B(x,y+1)}\right).$$

Fifth, when the color brightness calculation circuit 130 determines that the first sum is not less than the maximum luminance value, the color brightness calculation circuit 130 sets the rendered luminance value of the second color subpixel of the first display pixel as the maximum luminance value. For example, for the embodiment of FIG. 2 and FIG. 3, when the first sum is not less than the maximum luminance value (e.g., when L(G(x,y)+L(G(x,y+1) L(G(255))), the rendered luminance value of the second color subpixel of the first display pixel (e.g., the green subpixel G of the display pixel 310$_{11}$) is set as the maximum luminance value (e.g., (L(G(255)). Specifically, since the first sum of the luminance values of the second color subpixels of the RGB pixel set is not less than the maximum luminance value, the rendered luminance value of the second color subpixel of the first display pixel is limited to the maximum luminance value, and thus the maximum luminance value is assigned to the second color subpixel of the first display pixel.

Similarly, when the color brightness calculation circuit 130 determines that the second sum is not less than the maximum luminance value, the color brightness calculation circuit 130 sets the rendered luminance value of the third color subpixel of the second display pixel as the maximum luminance value. For example, for the embodiment of FIG. 2 and FIG. 3, when the second sum is not less than the maximum luminance value (e.g., when L(B(x,y)+L(B(x,y+1) L(B(255))), the rendered luminance value of the third color subpixel of the second display pixel (e.g., the blue subpixel B of the display pixel 310$_{21}$) is set as the maximum luminance value (e.g., (L(B(255)). Specifically, since the second sum of the luminance values of the third color subpixels of the RGB pixel set is not less than the maximum luminance value, the rendered luminance value of the third color subpixel of the second display pixel is limited to the maximum luminance value, and thus the maximum luminance value is assigned to the third color subpixel of the second display pixel.

In addition, when the color brightness calculation circuit 130 determines that the first sum is not less than the maximum luminance value, the color brightness calculation circuit 130 multiplies the maximum luminance value by the luminance value of the first color subpixel of the first RGB pixel to acquire a first product and then divide the first product by the first sum to acquire the rendered luminance value of the first color subpixel of the first display pixel. For example, for the embodiment of FIG. 2 and FIG. 3, when the first sum is not less than the maximum luminance value (e.g., when L(G(x,y)+L(G(x,y+1) L(G(255))), the color brightness calculation circuit 130 multiplies the maximum luminance value by the luminance value of the first color subpixel of the first RGB pixel to acquire a first product (e.g., L(R(x,y)*L(G(255)) and then divide the first product by the first sum (e.g., L(R(x,y)*L(G(255)/(L(G(x,y)+L(G(x,y+1))) to acquire the rendered luminance value of the first color subpixel of the first display pixel (e.g., the red subpixel R of the display pixel 310$_{11}$). Specifically, when the first sum is not less than the maximum luminance value, since the rendered luminance value of the second color subpixel of the first display pixel is limited to the maximum luminance value, the luminance value of the first color subpixel of the first RGB pixel assigned to the first color subpixel of the first display pixel is recalculated by multiplying with the maximum luminance value and dividing by the first sum to keep color and brightness consistency.

Similarly, when the color brightness calculation circuit 130 determines that the second sum is not less than the maximum luminance value, the color brightness calculation circuit 130 multiplies the maximum luminance value by the luminance value of the first color subpixel of the second RGB pixel to acquire a second product and then divide the second product by the second sum to acquire the rendered luminance value of the first color subpixel of the second display pixel. For example, for the embodiment of FIG. 2 and FIG. 3, when the second sum is not less than the maximum luminance value (e.g., when L(B(x,y)+L(B(x,y+1)L(B(255))), the color brightness calculation circuit 130 multiplies the maximum luminance value by the luminance value of the first color subpixel of the second RGB pixel to acquire a second product (e.g., L(R(x,y+1)*L(B(255)) and then divide the second product by the second sum (e.g., L(R(x,y+1)*L(B(255)/(L(B(x,y)+L(B(x,y+1))) to acquire the rendered luminance value of the first color subpixel of the second display pixel (e.g., the red subpixel R of the display pixel 310$_{21}$). Specifically, when the second sum is not less than the maximum luminance value, since the rendered luminance value of the third color subpixel of the second display pixel is limited to the maximum luminance value, the luminance value of the first color subpixel of the second RGB pixel assigned to the first color subpixel of the second display pixel is recalculated by multiplying with the maximum luminance value and dividing by the second sum to keep color and brightness consistency.

To sum up, when the first sum is not less than the maximum luminance value, the rendered luminance value of the second color subpixel of the first display pixel (e.g., the green subpixel G of the display pixel 310$_{11}$) is set as the maximum luminance value (e.g., (L(G(255)), and the rendered luminance value of the first color subpixel of the first display pixel (e.g., the red subpixel R of the display pixel 310$_{11}$) is set by dividing the first product by the first sum (e.g., L(R(x,y)*L(G(255)/(L(G(x,y)+L(G(x,y+1))). Therefore, a ratio of the rendered luminance values of the first color subpixel and the second color subpixel of the first display pixel (e.g., $$\left.\frac{L\big(R(x,y)*L\big(G(255)/(L(G(x,y)+L(G(x,y+1))\big)}{L(G(255)}\right)$$

is identical to a ratio between the luminance value of the first color subpixel of the first RGB pixel and the first sum (e.g., $$\left.\frac{L(R(x,y)}{L(G(x,y)+L(G(x,y+1)}\right).$$

Similarly, when the second sum is not less than the maximum luminance value, the rendered luminance value of the third color subpixel of the second display pixel (e.g., the blue subpixel B of the display pixel 310$_{21}$) is set as the maximum luminance value (e.g., (L(B(255)), and the rendered luminance value of the first color subpixel of the second display pixel (e.g., the red subpixel R of the display pixel 310$_{21}$) is set by dividing the second product by the second sum (e.g., L(R(x,y+1)*L(B(255)/(L(B(x,y)+L(B(x,y+1))). Therefore, a ratio of the rendered luminance values of the first color subpixel and the third color subpixel of the second display pixel (e.g., $$\left.\frac{L\big(R(x,y+1)*L\big(B(255)/(L(B(x,y)+L(B(x,y+1))\big)}{L(B(255)}\right)$$

is identical to a ratio between the luminance value of the first color subpixel of the second RGB pixel and the second sum (e.g., $$\left.\frac{L(R(x,y+1)}{L(B(x,y)+L(B(x,y+1)}\right).$$

As discussed above, since the ratio of the rendered luminance values between the first color subpixel and the second/third color subpixel of the display pixel set is maintained to be identical to the ratio of the luminance values of the first color subpixel and the second/third color subpixels of the RGB pixel set, the present invention keeps the color and brightness consistency. Therefore, the apparatus 10 can convert the RGB input data to output RGBW data by RGBW subpixel structure meanwhile optimize the color and brightness consistency.

As shown in FIG. 1, the white brightness calculation circuit 140 is coupled to the gray-to-luminance circuit 110, the HSV calculation circuit 120, and the memory 170. The white brightness calculation circuit 140 receives the luminance value of each subpixel of the RGB pixel set from the gray-to-luminance circuit 110 and receives the saturation value of each RGB pixel of the RGB pixel set from the HSV calculation circuit 120, and then correspondingly calculates a rendered luminance value of each white subpixel of the display pixel set of the RGBW display panel 30.

The process that the white brightness calculation circuit 140 calculates the rendered luminance value of each white subpixel of the display pixel set of the RGBW display panel 30 is discussed below.

First, the white brightness calculation circuit 140 calculates a sum (also called a first sum herein) of the luminance values of the second color subpixels of the first RGB pixel and the second RGB pixel and calculates a sum (also called a second sum herein) of the luminance values of the third color subpixels of the first RGB pixel and the second RGB pixel. For example, for the embodiment of FIG. 2, the white brightness calculation circuit 140 calculates a first sum (e.g., L(G(x,y)+L(G(x,y+1))) of the luminance values of the green subpixels of the RGB pixels 210$_{11}$ and 210$_{21}$ and calculates a second sum (e.g., L(B(x,y)+L(B(x,y+1))) of the luminance values of the blue subpixels of the RGB pixels 210$_{11}$ and 210$_{21}$.

Second, the white brightness calculation circuit 140 determines whether the aforementioned sum (i.e., the first sum or the second sum) is less than a maximum luminance value of each subpixel of the RGBW display panel 30.

Third, the white brightness calculation circuit 140 receives the saturation value of each RGB pixel of the RGB pixel set from the HSV calculation circuit 120, and then correspondingly acquires a first saturation gray white weight according to the saturation value of the first RGB pixel by utilizing a saturation-gray-white-weight lookup table stored in the memory 170, and correspondingly acquires a second saturation gray white weight according to the saturation value of the second RGB pixel by utilizing the saturation-gray-white-weight lookup table. The saturation-gray-white-weight lookup table shows the relationship between the saturation value and the corresponding saturation gray white weight. Table 3 shows portions of the saturation-gray-white-weight table. The saturation value is normalized to a range of 0 to 1023. For example, when the input saturation value is normalized to 64, then the corresponding saturation gray white weight is 0.95. In order to reduce the amount of data maintained in the saturation-gray-white-weight lookup table, the output saturation gray white weights corresponding to the input saturation values that are in blocks of multiple levels (e.g., 16 levels) may be maintained and an output saturation gray white weight corresponding to an input saturation value not maintained in the table data can be determined by appropriate interpolation, such as linear interpolation generally used. Note that Table 3 is merely an illustrated example, and the present invention is not limited thereto.

TABLE 3

| Saturation value | 0 | 64 | 128 | 192 | . . . | 960 | 1023 |
|---|---|---|---|---|---|---|---|
| Saturation gray white weight | 1.00 | 0.95 | 0.90 | 0.85 | . . . | 0.00 | 0.00 |

Further, the white brightness calculation circuit 140 receives the saturation value of each RGB pixel of the RGB pixel set from the HSV calculation circuit 120, and then correspondingly acquires a first saturation color white weight according to the saturation value of the first RGB pixel by utilizing a saturation-color-white-weight lookup table stored in the memory 170, and correspondingly acquires a second saturation color white weight according to the saturation value of the second RGB pixel by utilizing the saturation-color-white-weight lookup table. The saturation-color-white-weight lookup table shows the relationship between the saturation value and the corresponding saturation color white weight. Table 4 shows portions of the saturation-color-white-weight table. The saturation value is normalized to a range of 0 to 1023. For example, when the input saturation value is normalized to 960, then the corresponding saturation color white weight is 0.95. In order to reduce the amount of data maintained in the saturation-color-white-weight lookup table, the output saturation color white weights corresponding to the input saturation values that are in blocks of multiple levels (e.g., 16 levels) may be maintained and an output saturation color white weight corresponding to an input saturation value not maintained in the table data can be determined by appropriate interpolation, such as linear interpolation generally used. Note that Table 4 is merely an illustrated example, and the present invention is not limited thereto.

TABLE 4

| Saturation value | 0 | 64 | 128 | 192 | . . . | 960 | 1023 |
|---|---|---|---|---|---|---|---|
| Saturation color white weight | 0.00 | 0.00 | 0.00 | 0.05 | . . . | 0.95 | 1.00 |

As shown in Table 3 and Table 4, the saturation gray white weight decreases and the saturation color white weight increases as the saturation value increases. In other words, the first saturation gray white weight decreases and the first saturation color white weight increases as the saturation value of the first RGB pixel increases, and the second saturation gray white weight decreases and the second saturation color white weight increases as the saturation value of the second RGB pixel increases. As shown in Table 3 and Table 4, the saturation gray white weight and the saturation color white weight are in a range of 0 to 1. In other words, each of the first saturation gray white weight, the first saturation color white weight, the second saturation gray white weight, and the second saturation color white weight is in a range of 0 to 1.

Fourth, when the white brightness calculation circuit 140 determines that the first sum is less than the maximum luminance value, the white brightness calculation circuit 140 sets the rendered luminance value of the white subpixel of the first display pixel as a third product of the first saturation gray white weight and a sum of the luminance values of the subpixels of the first RGB pixel. For example, for the embodiment of FIG. 2 and FIG. 3, when the first sum is less than the maximum luminance value (e.g., when L(G(x,y)+L(G(x,y+1)<L(G(255))), the rendered luminance value of the white subpixel of the first display pixel (e.g., the white subpixel W of the display pixel $\mathbf{310}_{11}$) is set as a third product of the first saturation gray white weight and a sum of the luminance values of the subpixels of the first RGB pixel (e.g., (L(R(x,y)+L(G(x,y)+L(B(x,y))*the first saturation gray white weight).

Similarly, when the white brightness calculation circuit 140 determines that the second sum is less than the maximum luminance value, the white brightness calculation circuit 140 sets the rendered luminance value of the white subpixel of the second display pixel as a fourth product of the second saturation gray white weight and a sum of the luminance values of the subpixels of the second RGB pixel. For example, for the embodiment of FIG. 2 and FIG. 3, when the second sum is less than the maximum luminance value (e.g., when L(B(x,y)+L(B(x,y+1)<L(B(255))), the rendered luminance value of the white subpixel of the second display pixel (e.g., the white subpixel W of the display pixel $\mathbf{310}_{21}$) is set as a fourth product of the second saturation gray white weight and a sum of the luminance values of the subpixels of the second RGB pixel (e.g., (L(R(x,y+1)+L(G(x,y+1)+L(B(x,y+1))*the second saturation gray white weight).

To sum up, when the first sum is less than the maximum luminance value, the rendered luminance value of the white subpixel of the first display pixel (e.g., the white subpixel W of the display pixel $\mathbf{310}_{11}$) is set as a third product of the first saturation gray white weight and a sum of the luminance values of the subpixels of the first RGB pixel (e.g., (L(R(x, y)+L(G(x,y)+L(B(x,y))*the first saturation gray white weight). Therefore, the rendered luminance value of the white subpixel of the first display pixel is determined according to the saturation value of the first RGB pixel and the luminance value of each subpixel of the first RGB pixel.

Similarly, when the second sum is less than the maximum luminance value, the rendered luminance value of the white subpixel of the second display pixel (e.g., the white subpixel W of the display pixel $\mathbf{310}_{21}$) is set as a fourth product of the second saturation gray white weight and a sum of the luminance values of the subpixels of the second RGB pixel (e.g., (L(R(x,y+1)+L(G(x,y+1)+L(B(x,y+1))*the second saturation gray white weight). Therefore, the rendered luminance value of the white subpixel of the second display pixel is determined according to the saturation value of the second RGB pixel and the luminance value of each subpixel of the second RGB pixel.

Fifth, when the white brightness calculation circuit 140 determines that the first sum is not less than the maximum luminance value, the white brightness calculation circuit 140 multiplies the first saturation color white weight by a difference between the first sum and the maximum luminance value to acquire a fifth product and then add the third product and the fifth product to acquire the rendered luminance value of the white subpixel of the first display pixel. For example, for the embodiment of FIG. 2 and FIG. 3, when the first sum is not less than the maximum luminance value (e.g., when L(G(x,y)+L(G(x,y+1)<L(G(255))), the rendered luminance value of the white subpixel of the first display pixel (e.g., the white subpixel W of the display pixel $\mathbf{310}_{11}$) is set by adding the third product and the fifth product (e.g., (L(R(x,y)+L(G(x,y)+L(B(x,y))*the first saturation gray white weight+(L(G(x,y)+L(G(x,y+1))−L(G(255))*the first saturation color white weight).

Similarly, when the white brightness calculation circuit 140 determines that the second sum is not less than the maximum luminance value, the white brightness calculation circuit 140 multiplies the second saturation color white weight by a difference between the second sum and the maximum luminance value to acquire a sixth product and then add the fourth product and the sixth product to acquire the rendered luminance value of the white subpixel of the second display pixel. For example, for the embodiment of FIG. 2 and FIG. 3, when the second sum is not less than the maximum luminance value (e.g., when L(B(x,y)+L(B(x,y+1)<L(B(255))), the rendered luminance value of the white subpixel of the second display pixel (e.g., the white subpixel W of the display pixel $\mathbf{310}_{21}$) is set by adding the fourth product and the sixth product (e.g., (L(R(x,y+1)+L(G(x,y+1)+L(B(x,y+1))*the second saturation gray white weight+(L(B(x,y)+L(B(x,y+1))−L(B(255))*the second saturation color white weight).

To sum up, when the first sum is not less than the maximum luminance value, the rendered luminance value of the white subpixel of the first display pixel (e.g., the white subpixel W of the display pixel $\mathbf{310}_{11}$) is set by adding the third product and the fifth product (e.g., (L(R(x,y)+L(G(x,y)+L(B(x,y))*the first saturation gray white weight+(L(G(x,y)+L(G(x,y+1))−L(G(255))*the first saturation color white weight). Therefore, the rendered luminance value of the white subpixel of the first display pixel is determined according to the saturation value of the first RGB pixel and the luminance value of each subpixel of the first RGB pixel.

Similarly, when the second sum is not less than the maximum luminance value, the rendered luminance value of the white subpixel of the second display pixel (e.g., the white subpixel W of the display pixel $\mathbf{310}_{21}$) is set by adding the fourth product and the sixth product (e.g., (L(R(x,y+1)+L(G(x,y+1)+L(B(x,y+1))*the second saturation gray white weight+(L(B(x,y)+L(B(x,y+1))−L(B(255))*the second saturation color white weight). Therefore, the rendered luminance value of the white subpixel of the second display pixel is determined according to the saturation value of the second RGB pixel and the luminance value of each subpixel of the second RGB pixel.

As discussed above, since the rendered luminance value of the white subpixel of the display pixel is determined according to the saturation value of the corresponding RGB pixel and the luminance value of each subpixel of the corresponding RGB pixel, the present invention adjusts the white subpixel brightness by pixel data color feature. Therefore, the apparatus 10 can convert the RGB input data to output RGBW data by RGBW subpixel structure meanwhile optimize the color and brightness consistency.

As shown in FIG. 1, the luminance-to-gray circuit 150 is coupled to the color brightness calculation circuit 130, the white brightness calculation circuit 140, and the memory 170. The luminance-to-gray circuit 150 receives the rendered luminance value of each of the color subpixels of the display pixel set from the color brightness calculation circuit 130, and receives the rendered luminance value of each of white subpixels of the display pixel set from the white brightness calculation circuit 140, and correspondingly acquires a gray level value of each subpixel of the display pixel set. Specifically, the luminance-to-gray circuit 150 is coupled to the memory 170, and the luminance-to-gray circuit 150 acquires the gray level value of each subpixel of the display pixel set according to the input rendered luminance values by utilizing the gray-level-luminance lookup table stored in the memory 170.

The apparatus 10 may utilize the gray level value of each subpixel of the display pixel set as the display data for being output toward the data processing circuit 20, and may control the RGBW display panel 30 through the data processing circuit 20, in order to display the display data, where the apparatus 10 (e.g. a timing controller therein) may perform timing control on the data processing circuit 20, but the present invention is not limited thereto. According to some embodiments, one or more other circuits such as additional adjustment circuits may be added into the architecture shown in FIG. 1, and may be arranged to perform other processing such as other adjustment.

Based on the architecture shown in FIG. 1, the apparatus 10 that operates according to the method can properly control the RGBW display panel 30 to display various types of video contents meanwhile optimize the color and brightness consistency. Therefore, the method and apparatus of the present invention can guarantee the overall display performance of the RGBW display panel 30.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An apparatus for performing subpixel rendering of an RGBW display panel, comprising:
- a gray-to-luminance circuit configured to receive an input gray level data and correspondingly acquire a luminance value of each subpixel of a RGB pixel set comprising a first RGB pixel and a second RGB pixel adjacent to each other, wherein each of the first RGB pixel and the second RGB pixel comprises a first color subpixel, a second color subpixel, and a third color subpixel;
- a color brightness calculation circuit coupled to the gray-to-luminance circuit and configured to calculate a rendered luminance value of each color subpixel of a display pixel set of the RGBW display panel, wherein the display pixel set comprises a first display pixel and a second display pixel adjacent to each other, wherein the first display pixel corresponding to the first RGB pixel comprises a first color subpixel, a second color subpixel, and a white subpixel, wherein the second display pixel corresponding to the second RGB pixel comprises a first color subpixel, a third color subpixel, and a white subpixel;
- a luminance-to-gray circuit coupled to the color brightness calculation circuit and configured to receive the rendered luminance value of each subpixel of the display pixel set and correspondingly acquire a gray level value of each subpixel of the display pixel set; and
- a HSV calculation circuit coupled to the color brightness calculation circuit and configured to receive the input gray level data and correspondingly acquire a saturation value of each of the first RGB pixel and the second RGB pixel;
- wherein the color brightness calculation circuit is further configured to acquire a first saturation gain according to the saturation value of the first RGB pixel and acquire a second saturation gain according to the saturation value of the second RGB pixel;
- wherein a ratio of the rendered luminance values of the first color subpixel and the second color subpixel of the first display pixel is identical to a ratio between the luminance value of the first color subpixel of the first RGB pixel and a first sum of the luminance values of the second color subpixels of the first RGB pixel and the second RGB pixel, wherein a ratio of the rendered luminance values of the first color subpixel and the third color subpixel of the second display pixel is identical to a ratio between the luminance value of the first color subpixel of the second RGB pixel and a second sum of the luminance values of the third color subpixels of the first RGB pixel and the second RGB pixel.

2. The apparatus of claim 1, further comprising:

a memory configured to store a gray-level-luminance lookup table and a saturation-color-gain lookup table;

wherein the gray-to-luminance circuit coupled to the memory is configured to acquire the luminance value of each subpixel of the RGB pixel set according to the input gray level data by utilizing the gray-level-luminance lookup table;

wherein the luminance-to-gray circuit coupled to the memory is configured to acquire the gray level value of each subpixel of the display pixel set according to the rendered luminance value of each subpixel of the display pixel set by utilizing the gray-level-luminance lookup table;

wherein the color brightness calculation circuit coupled to the memory is configured to acquire the first saturation gain according to the saturation value of the first RGB pixel by utilizing the saturation-color-gain lookup table and acquire the second saturation gain according to the saturation value of the second RGB pixel by utilizing the saturation-color-gain lookup table.

3. The apparatus of claim 2, wherein the color brightness calculation circuit is configured to:

set the rendered luminance value of the second color subpixel of the first display pixel as a product of the first saturation gain and the first sum when the first sum is less than a maximum luminance value of each subpixel of the RGBW display panel; and set the rendered luminance value of the third color subpixel of the second display pixel as a product of the second saturation gain and the second sum when the second sum is less than the maximum luminance value.

4. The apparatus of claim 3, wherein the color brightness calculation circuit is further configured to:

set the rendered luminance value of the second color subpixel of the first display pixel as the maximum luminance value when the first sum is not less than the maximum luminance value; and set the rendered luminance value of the third color subpixel of the second display pixel as the maximum luminance value when the second sum is not less than the maximum luminance value.

5. The apparatus of claim 3, wherein the color brightness calculation circuit is further configured to:

set the rendered luminance value of the first color subpixel of the first display pixel as a product of the first saturation gain and the luminance value of the first color subpixel of the first RGB pixel when the first sum is less than the maximum luminance value; and set the rendered luminance value of the first color subpixel of the second display pixel as a product of the second saturation gain and the luminance value of the first color subpixel of the second RGB pixel when the second sum is less than the maximum luminance value.

6. The apparatus of claim 3, wherein the color brightness calculation circuit is further configured to:

multiply the maximum luminance value by the luminance value of the first color subpixel of the first RGB pixel to acquire a first product and then divide the first product by the first sum to acquire the rendered luminance value of the first color subpixel of the first display pixel when the first sum is not less than the maximum luminance value; and multiply the maximum luminance value by the luminance value of the first color subpixel of the second RGB pixel to acquire a second product and then divide the second product by the second sum to acquire the rendered luminance value of the first color subpixel of the second display pixel when the second sum is not less than the maximum luminance value.

7. The apparatus of claim 3, further comprising:

a white brightness calculation circuit coupled to the gray-to-luminance circuit and configured to calculate a rendered luminance value of each white subpixel of the display pixel set, wherein the rendered luminance value of the white subpixel of the first display pixel is determined according to the saturation value of the first RGB pixel and the luminance value of each subpixel of the first RGB pixel, wherein the rendered luminance value of the white subpixel of the second display pixel is determined according to the saturation value of the second RGB pixel and the luminance value of each subpixel of the second RGB pixel.

8. The apparatus of claim 7, wherein the white brightness calculation circuit is further configured to acquire a first saturation gray white weight and a first saturation color white weight according to the saturation value of the first RGB pixel and acquire a second saturation gray white weight and a second saturation color white weight according to the saturation value of the second RGB pixel.

9. The apparatus of claim 8, wherein the memory coupled to the white brightness calculation circuit is further configured to store a saturation-gray-white-weight lookup table and a saturation-color-white-weight lookup table;

wherein the white brightness calculation circuit is configured to acquire the first saturation gray white weight according to the saturation value of the first RGB pixel by utilizing the saturation-gray-white-weight lookup table and acquire the first saturation color white weight according to the saturation value of the first RGB pixel by utilizing the saturation-color-white-weight lookup table;

wherein the white brightness calculation circuit is configured to acquire the second saturation gray white weight according to the saturation value of the second RGB pixel by utilizing the saturation-gray-white-weight lookup table and acquire the second saturation color white weight according to the saturation value of the second RGB pixel by utilizing the saturation-color-white-weight lookup table.

10. The apparatus of claim 8, wherein the white brightness calculation circuit is configured to:

set the rendered luminance value of the white subpixel of the first display pixel as a third product of the first saturation gray white weight and a sum of the luminance values of the subpixels of the first RGB pixel when the first sum is less than the maximum luminance value; and set the rendered luminance value of the white subpixel of the second display pixel as a fourth product of the second saturation gray white weight and a sum of the luminance values of the subpixels of the second RGB pixel when the second sum is less than the maximum luminance value.

11. The apparatus of claim 10, wherein the white brightness calculation circuit is further configured to:

multiply the first saturation color white weight by a difference between the first sum and the maximum luminance value to acquire a fifth product and then add the third product and the fifth product to acquire the rendered luminance value of the white subpixel of the first display pixel when the first sum is not less than the maximum luminance value; and multiply the second saturation color white weight by a difference between the second sum and the maximum luminance value to acquire a sixth product and then add the fourth product and the sixth product to acquire the rendered luminance value of the white subpixel of the second display pixel when the second sum is not less than the maximum luminance value.

12. The apparatus of claim 8, wherein the first saturation gray white weight decreases and the first saturation color white weight increases as the saturation value of the first RGB pixel increases, wherein the second saturation gray white weight decreases and the second saturation color white weight increases as the saturation value of the second RGB pixel increases.

13. The apparatus of claim 12, wherein each of the first saturation gray white weight, the first saturation color white weight, the second saturation gray white weight, and the second saturation color white weight is in a range of 0 to 1.

14. The apparatus of claim 1, wherein the first saturation gain increases as the saturation value of the first RGB pixel increases, wherein the second saturation gain increases as the saturation value of the second RGB pixel increases.

15. The apparatus of claim 14, wherein each of the first saturation gain and the second saturation gain is in a range of 1 to 2.

16. An apparatus for performing subpixel rendering of an RGBW display panel, comprising:

a gray-to-luminance circuit configured to receive an input gray level data and correspondingly acquire a luminance value of each subpixel of a RGB pixel set comprising a first RGB pixel and a second RGB pixel adjacent to each other, wherein each of the first RGB pixel and the second RGB pixel comprises red, green, and blue subpixels;

a HSV calculation circuit configured to receive the input gray level data and correspondingly acquire a saturation value of each of the first RGB pixel and the second RGB pixel;

a white brightness calculation circuit coupled to the gray-to-luminance circuit and the HSV calculation circuit and configured to calculate a rendered luminance value of each white subpixel of a display pixel set of the RGBW display panel, wherein the display pixel set comprises a first display pixel and a second display pixel adjacent to each other, wherein the first display pixel corresponds to the first RGB pixel and the second display pixel corresponds to the second RGB pixel, wherein each of the first display pixel and the second display pixel comprises a white subpixel and two of a red subpixel, a green subpixel, and a blue subpixel, wherein the display pixel set comprises red, green, blue, and white subpixels, wherein the rendered luminance value of the white subpixel of the first display pixel is determined according to the saturation value of the first RGB pixel and the luminance value of each subpixel of the first RGB pixel, wherein the rendered luminance value of the white subpixel of the second display pixel is determined according to the saturation value of the second RGB pixel and the luminance value of each subpixel of the second RGB pixel; and a luminance-to-gray circuit coupled to the white brightness calculation circuit and configured to receive the rendered luminance value of each white subpixel of the display pixel set and correspondingly acquire a gray level value of each white subpixel of the display pixel set;

wherein a ratio of the rendered luminance values of the red subpixel and the green subpixel of the first display pixel is identical to a ratio between the luminance value of the red subpixel of the first RGB pixel and a first sum of the luminance values of the green subpixels of the first RGB pixel and the second RGB pixel, wherein a ratio of the rendered luminance values of the red subpixel and the blue subpixel of the second display pixel is identical to a ratio between the luminance value of the red subpixel of the second RGB pixel and a second sum of the luminance values of the blue subpixels of the first RGB pixel and the second RGB pixel.

* * * * *